Figure 1:
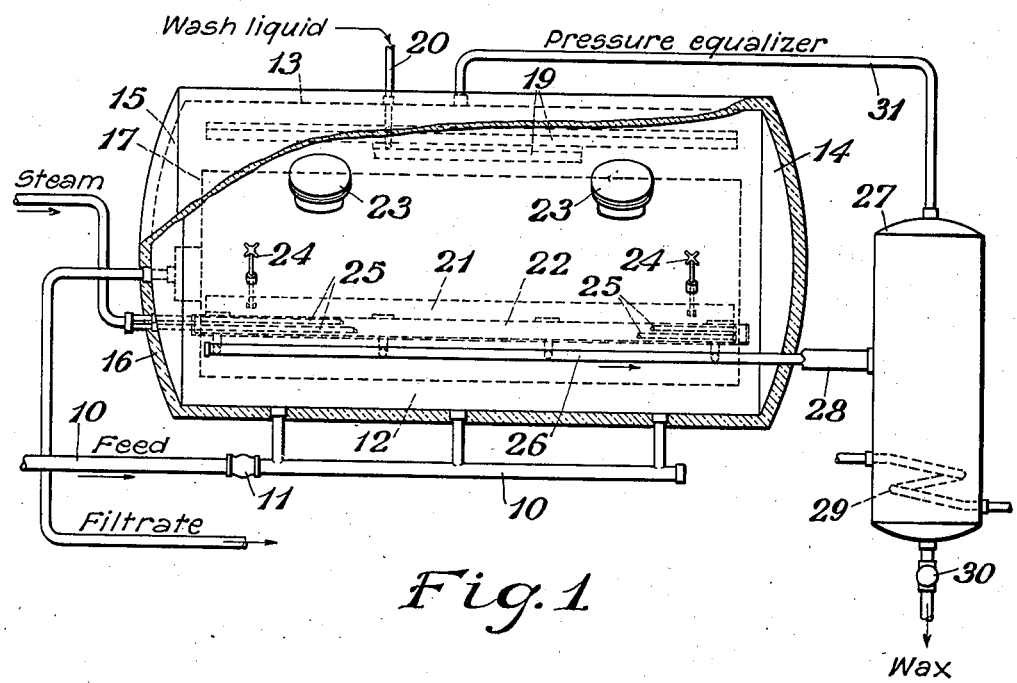

Patented Sept. 27, 1938

2,131,303

UNITED STATES PATENT OFFICE 2,131,303

REMOVAL OF WAX FROM ROTARY FILTERS

Robert B. Selund, Calumet City, Ill., assignor to Standard Oil Company, Chicago, Ill., a corporation of Indiana Application June 29, 1936, Serial No. 87,897

11 Claims. (Cl. 196—19)

This invention relates to removing wax from filters and pertains more particularly to removal of paraffin wax from continuous filters employed in the propane dewaxing of lubricating oils.

In commercial propane dewaxing plants much difficulty has been experienced in removing wax cake from the filters to the wax pots or stills. The wax cakes are often so dry that they cannot readily be handled by ordinary pumps. Screw conveyors have been employed with some degree of success but they are expensive and when used with very dry wax cakes it is usually necessary to make a thin slurry of the wax cake by adding liquid thereto, and pumps must always supplement the screw conveyor. The object of my invention is to overcome all of these difficulties, to avoid the use of screw conveyors altogether and to avoid the necessity of pumping dry wax cakes. A further object is to provide a cheaper, simpler and more efficient method of removing wax from continuous filters. A further advantage is that the wax produced can be almost immediately tested, without the difficulty of driving off much propane from the sample.

My invention is not limited to propane dewaxing systems but may be applied to any filter system wherein a readily liquefiable cake is to be removed from continuous filters in a closed system and wherein the heating of the wax cake to obtain liquefaction results in the liberation of pressuring gas for the filtration step. One of the objects of my invention is to vaporize propane or equivalent diluent from the wax cake in the filter shell so that the vaporized diluent may help to supply pressuring fluid in the filter.

A further object is to provide a pressure-equalizing system between the wax pot and the filter so that wax from the filter may flow by gravity to the pot, thereby avoiding the use of screw conveyors, pumps or other wax-propelling means. Other objects of the invention will be seen as the detailed description of the invention proceeds.

I have discovered that the wax discharged from the filter element may be melted before it leaves the filter chamber so that it may flow therefrom by gravity without the use of pumps or conveyor systems. It might appear incongruous to introduce steam coils into a chamber which must be maintained at temperatures of the order of 0 to −40° F. One would expect that this heater would warm the filter slurry to such an extent that the pour point of the finished oil would be impaired. Also, one would expect that a heater adjacent to the filter element would warm this element to such an extent that the wax would plug the filter cloth, partly due to radiated heat and partly due to the liberation of propane gas, which would thereupon be condensed on the exposed wax cake. I have discovered, however, that when the wax-receiving trough is heavily insulated there is no appreciable warming of the filter slurry. This trough is placed adjacent the filter element at a point where it is freed from wax and where blow-back gases and propane are cleaning the filter preparatory to its subsequent immersion; therefore a slight amount of heat at this point is helpful rather than harmful. Finally, I have discovered that the amount of liberated propane is relatively small and that no ill effects are produced by the condensation of this propane on the rapidly moving filter cake. The liquid wax is removed from the filter chamber to a pot which is connected through a pressure equalizer to the filter chamber so that no pumps or conveyors are required for the removal of the wax from the chamber. The melted wax may then be pumped to a stripping still.

In the accompanying drawing which forms a part of this specification, and in which similar parts are designated by like reference characters—

Figure 2:
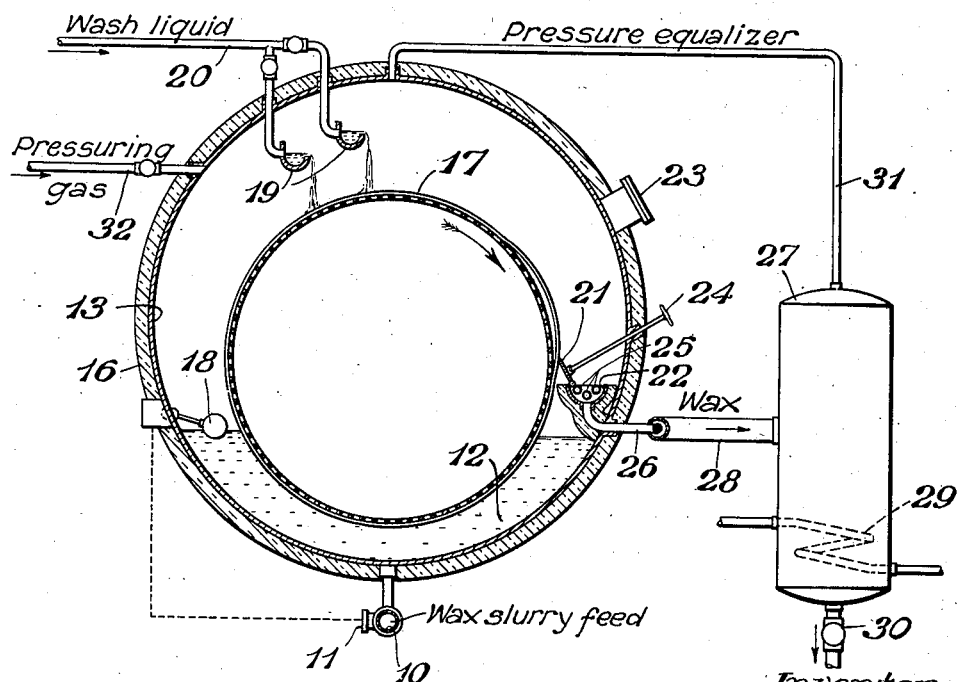

Fig. 1 is a diagrammatic elevation of a filter (some parts not shown in full) employing my improved wax removing means, and Fig. 2 is a diagrammatic vertical cross section.

Although my invention is particularly directed toward the removal of wax from propane dewaxing systems, it should be understood that the invention is equally applicable to the removal of wax from continuous filters and systems using other normally gaseous or volatile diluents. Likewise, while the invention will be described in connection with a continuous type of filter specially designed for propane dewaxing systems, it should be understood that it is equally applicable to the use of other types of continuous filters, particularly of the Oliver type.

My invention is applicable to processes for dewaxing any and all types of lubricating oils, varying from light paraffin distillates to heavy steam-refined stocks, overhead bright stocks and residual stocks. These stocks may be from any wax-bearing crude whatsoever and the stock may or may not have had preliminary refining treatments such as propane deasphalting, acid treating, solvent extraction for the removal of naphthenic components, etc. As a preferred example I will describe the dewaxing of a Mid-Continent distillate having a viscosity of about 70 seconds at 210° F.

The blending and chilling of a waxy oil stock with propane forms no part of the present invention and these operations will therefore not be described in detail. Sufficient propane is usually employed to insure about 2 to 3 volumes of propane to a volume of waxy oil in the final chilled mixture, although less may be employed with light paraffin distillates. The blend is originally heated to a relatively high temperature which, in the case of residual stocks, may be from 140 to 190° F., while paraffin distillates and lighter stocks may be blended at temperatures of 90 to 100° F. The cooling may be by indirect heat exchange or by direct vaporization of propane from the mixture, and the optimum rate in the method of cooling may be determined by experiment for any particular stock.

A wax slurry which may, for example, have been obtained according to the process described in Giles Patent 1,943,236, is introduced through line 10 and regulating valve 11 to the lower part of filter chamber 12 (Fig. 2). This filter chamber is preferably a cylindrical vessel 13 provided with end closures 14 and 15 (Fig. 1), the vessel being designed to withstand high pressures and low temperatures. The vessel is covered with insulating material 16 and one of the end closures is removable to provide access to the rotatable filter element 17 which is preferably mounted closer to the bottom of the vessel than to the top thereof. The filter element may be of the conventional Oliver type and will therefore not be described in detail. The invention is applicable to the use of any continuous rotatable filter element.

Instead of employing a separate feed bowl I may introduce the wax slurry directly into the base of chamber 12 and I may maintain a constant liquid level in the vessel by means of float 18 (Fig. 2) and any conventional electrical or mechanical devices for regulating valve 11 in accordance with the position of float 18.

As the filter element 17 rotates in a clockwise direction (Fig. 2), a wax cake is built up on the filter element which is immersed in the wax slurry. As the wax cake emerges from the slurry it may be washed with liquid propane which may be evenly distributed over the advancing cake by troughs 19 which are supplied with wash liquid through line 20. The washed cake is then dried by the passage of propane vapors therethrough as it emerges from the washing zone. Finally, the cake reaches the wax discharge zone, where a blow-back gas, which is preferably propane containing some propane liquid, distends the filter element and causes the cake to be removed and directed by scraper 21 into insulated trough 22. The removal of the cake may be observed through sight window 23, and the position of the scraper may be regulated by manual control means 24.

Heretofore it has been necessary to provide a screw conveyor in the wax-receiving trough in order to discharge the wax cake from the filter chamber. I avoid the necessity of any such mechanical wax-removing means by employing heating coils 25 in insulated wax trough 22, the heating coils extending the full length of the trough. I have found that in dewaxing filters operating at from zero to —40° F. I may use steam at 90 to 100 pounds pressure in coils which present one square foot of surface per pound of wax to be removed per minute. The necessary heat input must, of course, be determined by the amount and nature of wax to be removed and the temperature of filtration. The melted wax in the trough may be of a temperature of about 100 to 150° F., or at such temperature that it will readily flow through discharge pipe 26 to wax pot 27. Pipe 26 may be thoroughly insulated to prevent solidification of wax therein but I prefer to maintain a steam jacket 28 around the pipe for conveying the molten wax to the pot.

While I have described the use of steam pipes for melting the wax in insulated trough 22, it should be understood that electrical heating means or any other wax melting means may be employed. The wax may, in fact, be melted by the use of hot oil in pipes 22 or the spraying of hot oil directly on the wax cake in the trough.

It is essential to heavily insulate any part of the pipe 26 which is in the filter chamber. This insulation is not only required to prevent loss, but it is necessary to prevent the heating of the wax slurry, since this would cause more wax to be dissolved in the propane oil solution, with the subsequent impairment of the pour point of the finished lubricating oil. No particular type of insulating means is required but I have found that magnesia asbestos pipe covering which has been covered with a coating of material impervious to the slurry gives very satisfactory results.

The heating of the wax cake in the filter chamber necessarily causes the liberation of propane therefrom; propane which has heretofore been vaporized in a wax still is, in accordance with my invention, liberated from the wax directly in the filter chamber. It might appear to be contrary to good engineering practice to liberate warm propane vapors in a filter chamber which must be operating at a temperature from zero to —40 F. because if the wax slurry or the filter cake is appreciably warmed the pour point of the finished oil will be impaired and the filter element will probably become plugged. I have discovered, however, that the amount of propane liberated from the wax cake is relatively small and that its effect on the temperature equilibrium inside the filter chamber is negligible. This method of wax removal has been in use for many months and experience has shown that it does not cause an undue temperature rise in the wax slurry or the material on the filter element, but, on the contrary, facilitates wax removal and insures a continuous smooth operation of the filter. The top of pot 27 is connected by line 31 to the upper part of filter chamber 12 so that the pressure in the pot will be the same as the pressure in the filter. By employing this pressure-equalizing line I insure a gravity flow of melted wax from trough 22 through line 26 to pot 27.

Additional pressuring gas may be introduced into the filter chamber through line 32 (Fig. 2) in amounts required for maintaining a proper pressure differential across the filter element. The inner or filtrate side of the filter element should be maintained at a pressure sufficient to prevent the flashing or boiling of filtrate and the filter chamber 12 outside of the filter element should be maintained at a pressure preferably about 2 to 8 pounds higher than the pressure on the inside. Automatic means may be employed to maintain the pressure on the filtrate side high enough to prevent the boiling of filtrate, and to introduce pressuring gas through line 32 in amounts sufficient to maintain the desired pressure differential.

The rate of rotation of the filter element will depend somewhat on the nature of the stock being dewaxed and on the structure of the filter but when using an Oliver filter drum with Mid-Continent stock, as above described, I find that the rate of rotation may be about ⅛ to ¾ revolution per minute.

Filters of the type hereinabove described are usually operated in parallel, in which case wax from all of the filters may be discharged into a single wax pot which in turn will be connected by pressure equalizers to each of the filters. Where it is desired to operate the several filters under different conditions of temperature or pressure, however, I may provide each individual filter with a separate wax pot 27 and pressure equalizer 31, as shown in Figs. 1 and 2. The utilization of the refrigerating value of the filter and the removal of propane from the filtrate may be effected in accordance with conventional practice and these features are therefore not described in detail.

While I have described in detail the preferred embodiment of my invention, it should be noted that I do not limit myself to the above details except as defined by the following claims, which should be construed as broadly as the prior art will permit.

I claim:

1. The method of removing a liquefiable filter cake from the chamber of a closed continuous filter to a closed collector without the use of mechanical impelling means, which comprises heating and liquefying said cake as it is discharged from said filter and before it leaves said filter chamber, withdrawing said liquefied filter cake by gravity to said closed collector and equalizing the pressure between said collector and said filter chamber.

2. The method of removing a meltable filter cake from the chamber of a closed continuous pressure filter to a separate closed vessel, which comprises maintaining an insulated heating zone in said chamber, discharging said cake from said filter into said heating zone, melting said cake in said heating zone, withdrawing said melted cake to said separate vessel and equalizing the pressure in said vessel with the pressure in the filter chamber.

3. The method of removing a wax cake from a continuous propane dewaxing filter chamber without the use of mechanical impelling means, which comprises melting said cake in said filter chamber in a thermally insulated heating zone, withdrawing the melted wax in liquid form from said zone and utilizing the propane liberated from the heating zone as pressuring gas in said filter chamber.

4. The method of removing wax from a continuous propane dewaxing filter chamber which comprises maintaining a thermally insulated heating zone in said chamber, discharging wax cakes from said continuous filter into said heating zone, melting said wax in said heating zone and liberating propane therefrom, withdrawing said melted wax as a liquid from said chamber, heating the withdrawn wax to remove further propane therefrom and returning said propane through a pressure equalizing line to said filter chamber.

5. In a dewaxing system, a closed filter chamber, a rotatable filter element mounted in said chamber, a wax scraper for removing wax cake from said filter element, a thermally insulated wax collector in said chamber for receiving wax discharged from said scraper, a heater in said wax collector for melting said wax and liberating propane therefrom, a conduit for removing molten wax from said wax collector to a point outside of said wax filter chamber and means for maintaining a substantially constant pressure in said filter chamber.

6. The apparatus of claim 5 wherein the conduit is provided with heating means to maintain the wax in liquid condition.

7. In apparatus of the class described, a closed filter chamber, means for maintaining a slurry in the lower part of said filter chamber, a filter element immersed in said slurry and rotatably mounted in said chamber, a thermally-insulated wax collected in said chamber adjacent said filter element and above the level of said slurry, a wax scraper for removing wax from said element and directing said wax into said collector, means for heating said wax in said collector for melting said wax and liberating propane therefrom, and an open conduit for conducting liquid wax from said collector to a point outside of said chamber.

8. The apparatus of claim 7 wherein the open conduit is insulated in said chamber and is surrounded by heating means outside of said chamber.

9. The apparatus of claim 7 which includes a wax still, heating means for said wax still, said wax still being connected to the discharge end of said open conduit, and a pressure equalizer between said wax still and said filter chamber.

10. In a continuous propane dewaxing system, wherein wax is continuously discharged from a rotating filter element partially immersed in a filterable wax slurry, the method of reconditioning the filter element subsequent to wax removal and prior to immersion into said slurry, which comprises passing said filter element in close proximity to a heating element and simultaneously blowing a blowback gas through said filter element from the inner side thereof.

11. In a continuous propane dewaxing system wherein wax is continuously discharged from a rotating filter element partially immersed in a filterable wax slurry, the method of removing wax in liquid form without unduly increasing the temperature inside the filter, which comprises discharging wax cake from said continuous filter into an insulated heating zone, melting said wax in said heating zone and liberating propane therefrom, and counteracting a temperature increase in the filter by introducing thereinto liquid propane which has been cooled below the operating temperature of the filter.

ROBERT B. SELUND.